(12) United States Patent
Jiang et al.

(10) Patent No.: US 12,161,265 B2
(45) Date of Patent: Dec. 10, 2024

(54) KITCHEN APPLIANCE

(71) Applicant: VERSUNI HOLDING B.V., Eindhoven (NL)

(72) Inventors: Ou Jiang, Eindhoven (NL); Samuel Jr Agustin Cuaresma, Eindhoven (NL); Shaofa Chen, Eindhoven (NL); XiaoMing Xu, Eindhoven (NL)

(73) Assignee: VERSUNI HOLDING B.V., Eindhoven (NL)

(*) Notice: Subject to any disclaimer, the term of this patent is extended or adjusted under 35 U.S.C. 154(b) by 0 days.

(21) Appl. No.: 18/712,669

(22) PCT Filed: Nov. 10, 2022

(86) PCT No.: PCT/EP2022/081528
§ 371 (c)(1),
(2) Date: May 22, 2024

(87) PCT Pub. No.: WO2023/094174
PCT Pub. Date: Jun. 1, 2023

(65) Prior Publication Data

US 2024/0324821 A1 Oct. 3, 2024

(30) Foreign Application Priority Data

Nov. 23, 2021 (WO) .............. PCT/CN2021/132423
Jan. 17, 2022 (EP) .................................. 22151764

(51) Int. Cl.
*A47J 43/00* (2006.01)
*A47J 43/046* (2006.01)
(Continued)

(52) U.S. Cl.
CPC ....... *A47J 43/0766* (2013.01); *A47J 43/0465* (2013.01); *A47J 43/0722* (2013.01); *A47J 43/085* (2013.01)

(58) Field of Classification Search
CPC ............... A47J 43/0722; A47J 43/0766; A47J 43/0465; A47J 43/085
See application file for complete search history.

(56) References Cited

U.S. PATENT DOCUMENTS 6,854,876 B2  2/2005  Dickson, Jr.
10,010,221 B2  7/2018  Pan
(Continued)

FOREIGN PATENT DOCUMENTS

CN  107427157 A  12/2017
CN  213551360 U  6/2021
(Continued)

OTHER PUBLICATIONS

Extended European Search Report issued in connection with corresponding EP Application No. 22151764.2 dated Jul. 7, 2022.

*Primary Examiner* — Anshu Bhatia
(74) *Attorney, Agent, or Firm* — Maschoff Brennan

(57) ABSTRACT

A kitchen appliance has a motorized base and a food container with a rotary tool detachably mountable to the base. A safety switch is provided in the base and an actuator for actuating the safety switch is provided as part of the food container. The food container is mountable to the base with at least first and second angular orientations for setting different motor speed settings.

14 Claims, 5 Drawing Sheets

(51) Int. Cl.
*A47J 43/07* (2006.01)
*A47J 43/08* (2006.01)

(56) References Cited

U.S. PATENT DOCUMENTS

2020/0237159 A1   7/2020  Sapire
2021/0345829 A1*  11/2021 Finnance ............ A47J 43/0766
2021/0354100 A1*  11/2021 Sapire ................. A47J 43/0761

FOREIGN PATENT DOCUMENTS

| | | | |
|---|---|---|---|
| EP | 2273904 | A1 | 1/2011 |
| EP | 2962610 | A1 | 1/2016 |
| EP | 3113661 | A1 | 1/2017 |
| EP | 3517001 | A1 | 7/2019 |
| WO | 2021140333 | A1 | 7/2021 |

* cited by examiner

KITCHEN APPLIANCE

CROSS-REFERENCE TO RELATED APPLICATIONS

The present application is a U.S. National Phase application under 35 U.S.C. § 371 of International Application No. PCT/EP2022/081528 filed on Nov. 10, 2022, which claims the benefit of European Patent Application No. 22151764.2, filed on Jan. 17, 2022, and International Application No. PCT/CN2021/132423, filed on Nov. 23, 2021. These applications are hereby incorporated by reference herein.

FIELD OF THE INVENTION

This invention relates to kitchen appliances, and in particular kitchen appliances with a rotary tool within a food container, wherein the container may be attached to a motorized base of the appliance.

BACKGROUND OF THE INVENTION

One kitchen appliance of this type is a blender, with a separable base and food container. This type of configuration is for example common for smoothie makers as well as blenders and small food processors in general. The food container may comprise a jar set comprising a storage vessel and a tool holder. The tool holder may be separable from the storage vessel or else they may be a single unit.

The base comprises a motor which is coupled to drive the rotary tool of the tool holder.

There are typically two systems for controlling the motor. The first system is a safety system, which includes a safety switch in the base so that only when the food container is mounted to the base can the motor function. This prevents the motor from running when the food container is not attached and thus provides a safety function. The second system is a main control system which functions as the user interface for the user. It for example typically allows the user to select different speed settings and a pulsed mode of operation.

Thus, there are multiple components needed to implement both a safety feature and user control. The safety system and the main control system however have the same basic function which is to start the motor so that it drives the rotary tool when the food container is correctly mounted and locked on the base, and to apply the user's desired control setting.

It is known to provide a lower cost design with no user interface. In this case, the motor is activated as soon as the food container is correctly mounted. However, this only enables a single operating function with a single speed.

It would be desirable to provide an appliance with multiple user options but without the expense of dedicated user interface hardware.

SUMMARY OF THE INVENTION

According to examples in accordance with an aspect of the invention, there is provided a kitchen appliance, comprising:
 a base comprising:
  a motor;
  a rotary output coupling; and
  a safety switch, wherein actuation of the safety switch enables motor rotation to drive the rotary output coupling; and
 a food container detachably mountable to the base and comprising:
  a rotary food processing element;
  a rotary input coupling for coupling to the rotary output coupling of the base; and
  a safety switch actuator,
 wherein the motor has at least two speed settings and wherein the food container is mountable to the base with at least first and second angular orientations, wherein in each of the at least two angular orientations, the motor is set to a respective one of the at least two speed settings and the safety switch actuator actuates, or can be controlled to actuate, the safety switch.

This kitchen appliance has at least two speed settings, but does not require a separate user interface to enable the speed settings to be selected. Instead, the speed settings depend on the way the food container is mounted to the base. In particular, there are at least two angular orientations, each corresponding to a different speed setting. A single safety switch can be used to provide the motor control as well as to provide a safety function of turning off the motor when the food container is not mounted.

The safety switch for example comprises first and second safety switch parts, with one for each of the first and second angular orientations. Thus, the food container can be mounted with two orientations, and in each orientation a safety switch part is engaged by the food container so that motor operation is enabled. The different safety switch parts implement the different speed settings.

In one set of examples, the food container is mountable to the base directly with a selected one of the first and second angular orientations. Thus the container has two possible mounting orientations, for example 180 degrees apart.

In a most simple design, when the food container is mounted in the first and second angular orientations, the safety switch actuator actuates the safety switch for continuous motor operation. Thus, as soon as the food container is in the chosen angular position, a continuous motor operation is implemented.

In an alternative design, when the food container is mounted in the first angular orientation, the food container is manually depressible towards the base in order for the safety switch actuator to actuate the safety switch.

Thus, this first angular orientation functions both as a speed setting but also implements a pulsed operation mode, by which the user can push down on the container to actuate the safety switch and thereby manually control the on-off function of the motor.

There may be only one speed setting with a pulsed mode, Alternatively, when the food container is mounted in the second angular orientation, the food container may again be depressible towards the base in order for the safety switch actuator to actuate the safety switch.

In this way, each of the two speed settings has a pulsed operation mode.

For the pulsed mode, the food container is for example depressible against the force of a spring sufficient to support a maximum full container weight.

In another set of examples, the food container is mountable to the base with a third angular orientation and is then rotatable into the first or second angular orientations.

In this way, there is only one correct way to mount the food container to the base, and it is then rotated into the two (or more) speed settings. This is similar to a standard way to make a bayonet connection.

When the food container is rotated to the first or second angular orientations, the safety switch actuator may actuate the safety switch for continuous motor operation. Thus, the first and second angular orientations are for a continuous mode of operation.

When the food container is mounted in the third angular orientation, the food container may be depressible towards the base in order for the safety switch actuator to actuate the safety switch.

Thus, a pulsed mode of operation may be enabled when in the initial third angular orientation. The food container is again then depressible against the force of a spring sufficient to support a maximum full container weight. The food container is for example only rotatable from the third angular orientation when in the depressed state.

The food container may be rotatable in one direction from the third angular orientation to the first and second orientations each having a locked position in which the safety switch actuator actuates the safety switch, and the food container is rotatable in an opposite direction from the third angular orientation to a fourth angular orientation without a locked position. The locking is reversible, in that it is simply a default stable position for the food container.

The fourth angular orientation is in this case a non-locked position, and it may thus be used for a pulsed mode. For example, a spring return system may be provided for returning the container from the fourth angular orientation to the third angular orientation. This makes the pulsed mode easier to use for the user.

The kitchen appliance for example comprise a blender and the food processing element comprises a blade.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
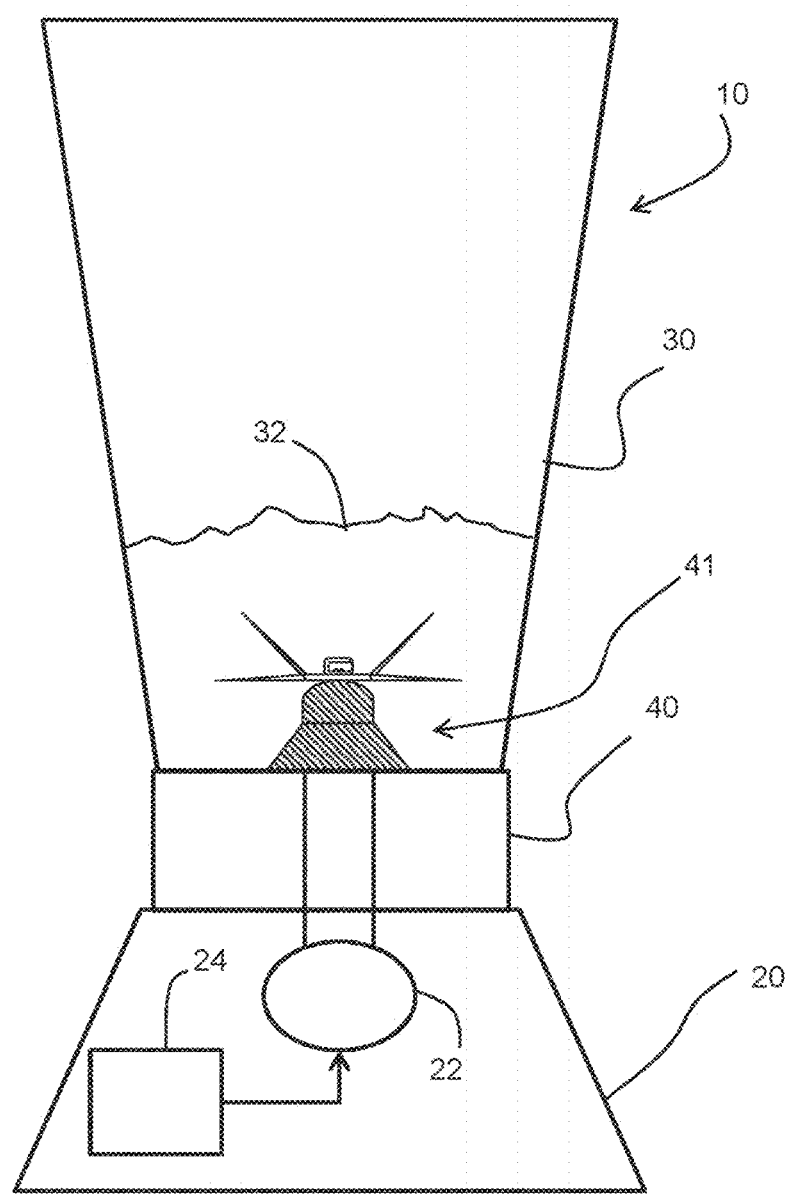
FIG. 1 shows a kitchen appliance of the type to which the invention may be applied.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a kitchen appliance having a motorized base and a food container with a rotary tool detachably mountable to the base. A safety switch is provided in the base and an actuator for actuating the safety switch is provided as part of the food container. The food container is mountable to the base with at least first and second angular orientations for setting different motor speed settings.

FIG. 1 shows a kitchen appliance of the type to which the invention may be applied. The kitchen appliance 10 comprises a base 20 housing a motor 22 and a controller 24, a food container 30 (i.e. a jar) for receiving food 32 for processing e.g. blending and a tool holder 40. The tool holder 40 fits over a top opening of the jar 30, for example by a screw fit. The tool holder 40 houses a rotary tool 41, such as a blending blade.

The food container 30 and tool holder 40 mount to a top the base 20.

The jar 30 is filled with food items to be blended, and the tool holder 40 is then fitted over the top. Thus, the tool holder functions as a lid of the jar. The jar is then inverted to mount it over the base, in the orientation shown in FIG. 1.

In an alternative design, the tool holder 40 is a fixed part of the jar, and there is a lid at the top. Thus, the jar is mounted to the base, and food can be added from the open top (with the lid removed) during use, or the lid may be closed.

A mechanical interlocking is for example provided to fit the tool holder 40 to the base 20, such as a bayonet coupling. This coupling provides mechanical connection of the jar set (the container and the attached tool holder) to the base as well as providing a rotary coupling. It also closes a safety switch which prevents the motor operating when the container and tool holder are not fitted to the base.

It is also known to implement a rotary coupling between the motor in the base and the rotary tool using a magnetic drive coupling. The magnetic drive coupling for example has a first portion in the base and a second portion in the jar or tool holder. The magnetic attraction between the two parts provides both a rotary coupling and a mechanical alignment. Thus, there is no need for interlocking mechanical parts.

Figure 2:
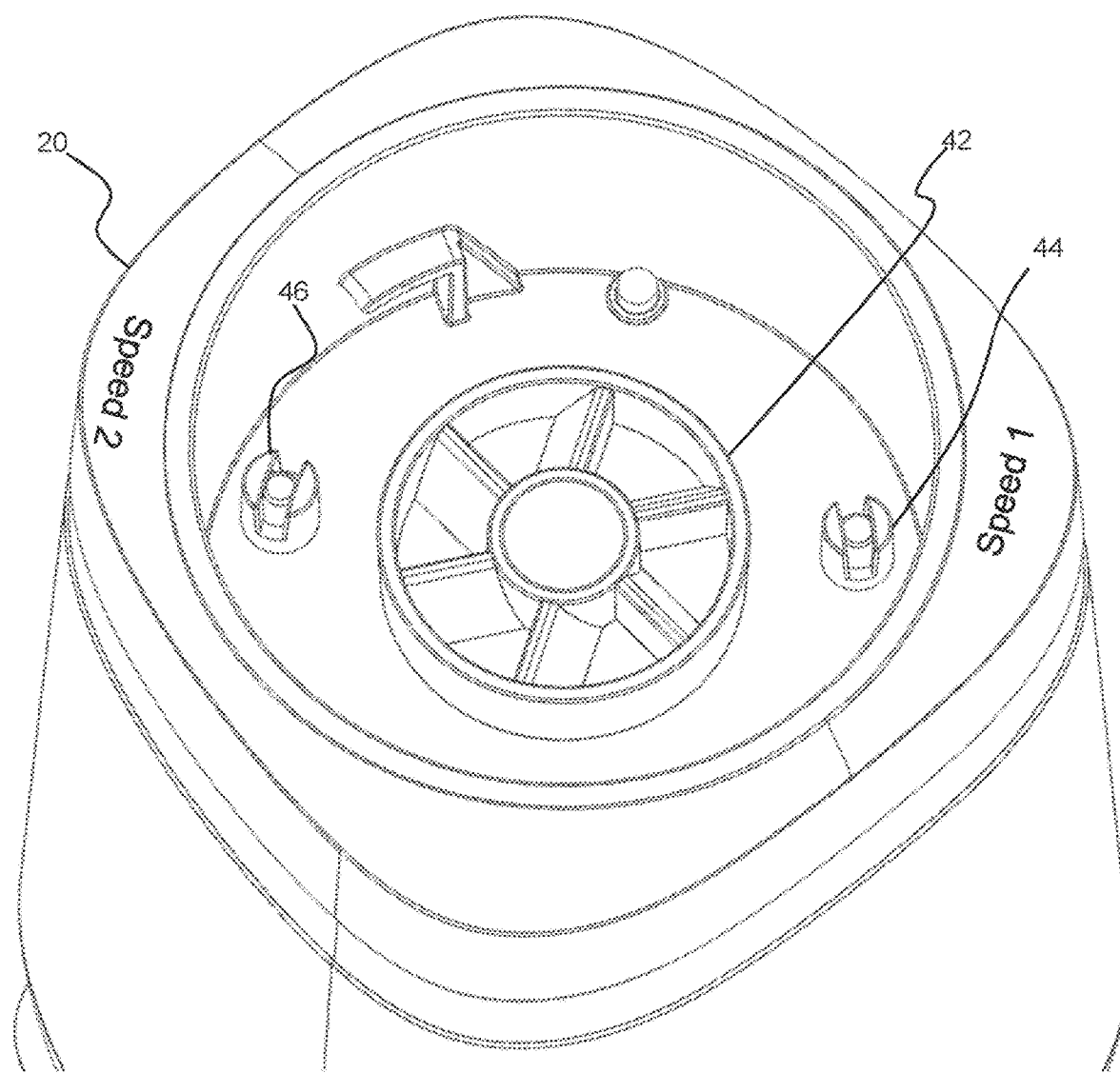
FIG. 2 shows a first example of a top of the base to which the food container attaches.

FIG. 2 shows a first example of a top of the base 20 to which the food container attaches. The base 20 houses a motor which drives a rotary output coupling 42. A safety switch is provided, which in this example comprises a first part 44 and a second part 46 disposed 180 degrees apart. The food container has a safety switch actuator for actuating one of the two safety switch parts 44, 46. When either safety switch part is actuated, the motor is supplied with power to drive the rotary output coupling 42.

The food container is detachably mountable to the base directly with a selected one of the first and second angular orientations. When mounted, a rotary input coupling of the food container is coupled to the rotary output coupling 42 of the base, and a rotary tool (rotary food processing element) within the container is coupled for rotation with the rotary input coupling.

The first safety switch part 44 is associated with a first speed setting of the motor and the second safety switch part 46 is associated with a second speed setting. The orientation with which the food container is connected to the base determines the speed setting, and once the food container is mounted, the rotary food processing element is driven with the selected speed.

The mounting of the food container to the base for example is a push and twist coupling such as a bayonet coupling. Only after the twist is the safety switch actuated, but the first and second "orientation" may be considered to include the small twist to lock the mounting.

Figure 3:
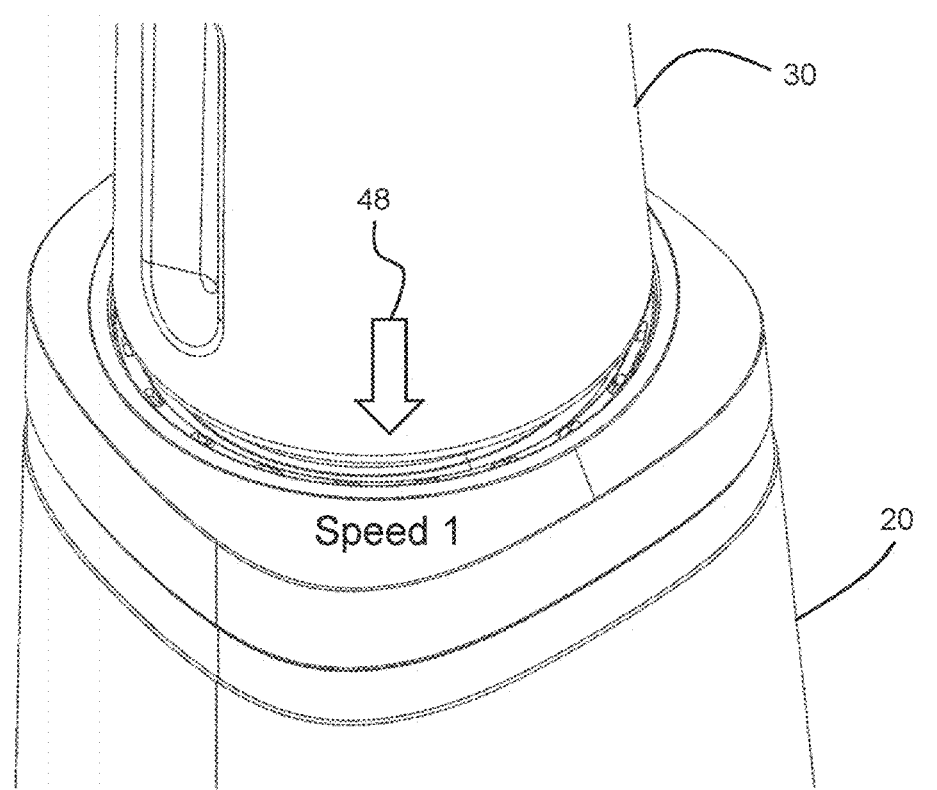
FIG. 3 shows the container attached to the base with a marker indicating that the orientation is for the first speed setting.
Figure 4:
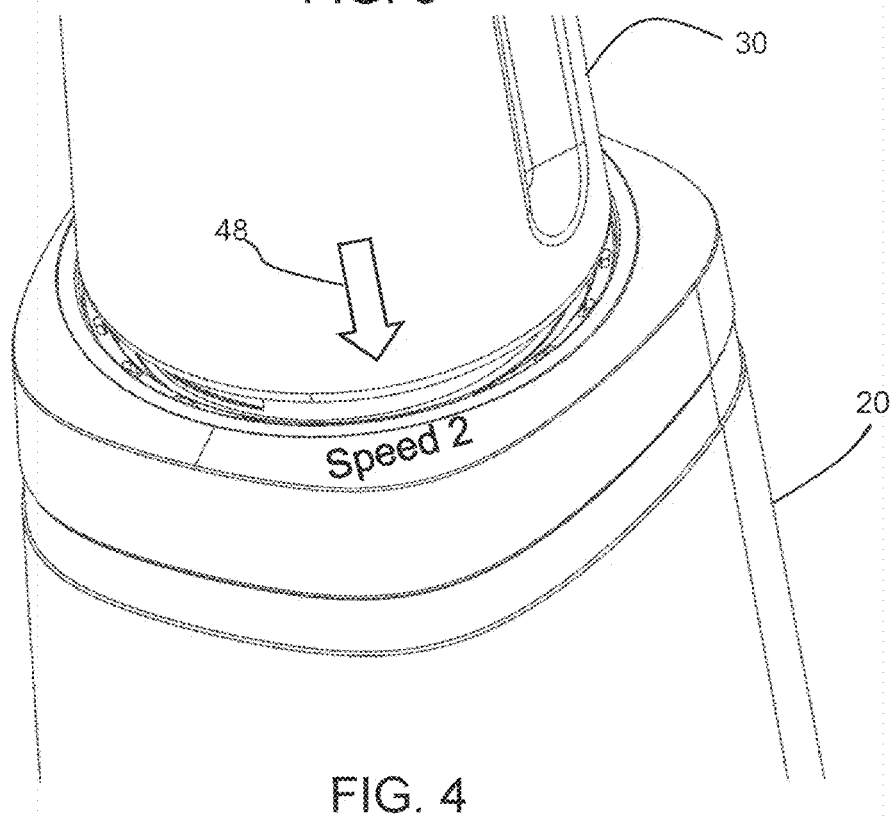
FIG. 4 shows the container attached to the base with the marker indicating that the orientation is for the second speed setting.

FIG. 3 shows the container attached to the base with a marker 48 indicating that the orientation is for the first speed setting. FIG. 4 shows the container attached to the base with the marker 48 indicating that the orientation is for the second speed setting.

In a most basic example, as soon as the food container is mounted in the chosen angular orientation, the safety switch actuator actuates the (selected part of the) safety switch for continuous motor operation.

However, in an alternative design, once the container is mounted in the desired orientation, the user must push down on the container to actuate the safety switch. This may apply to both orientations (when there are two) or it may apply to one of them. In this way, the user can hold the container down for continuous operation or the user can push down then release the container to implement a pulsed mode. For this purpose, the safety switch is normally in an off state (when no downward force is applied by the user), with the food container lifted by a spring force to prevent actuation of the safety switch. When the safety switch is actuated by the user pushing down on the food container, the motor in the base is operated to drive the rotary output coupling.

Figure 5:
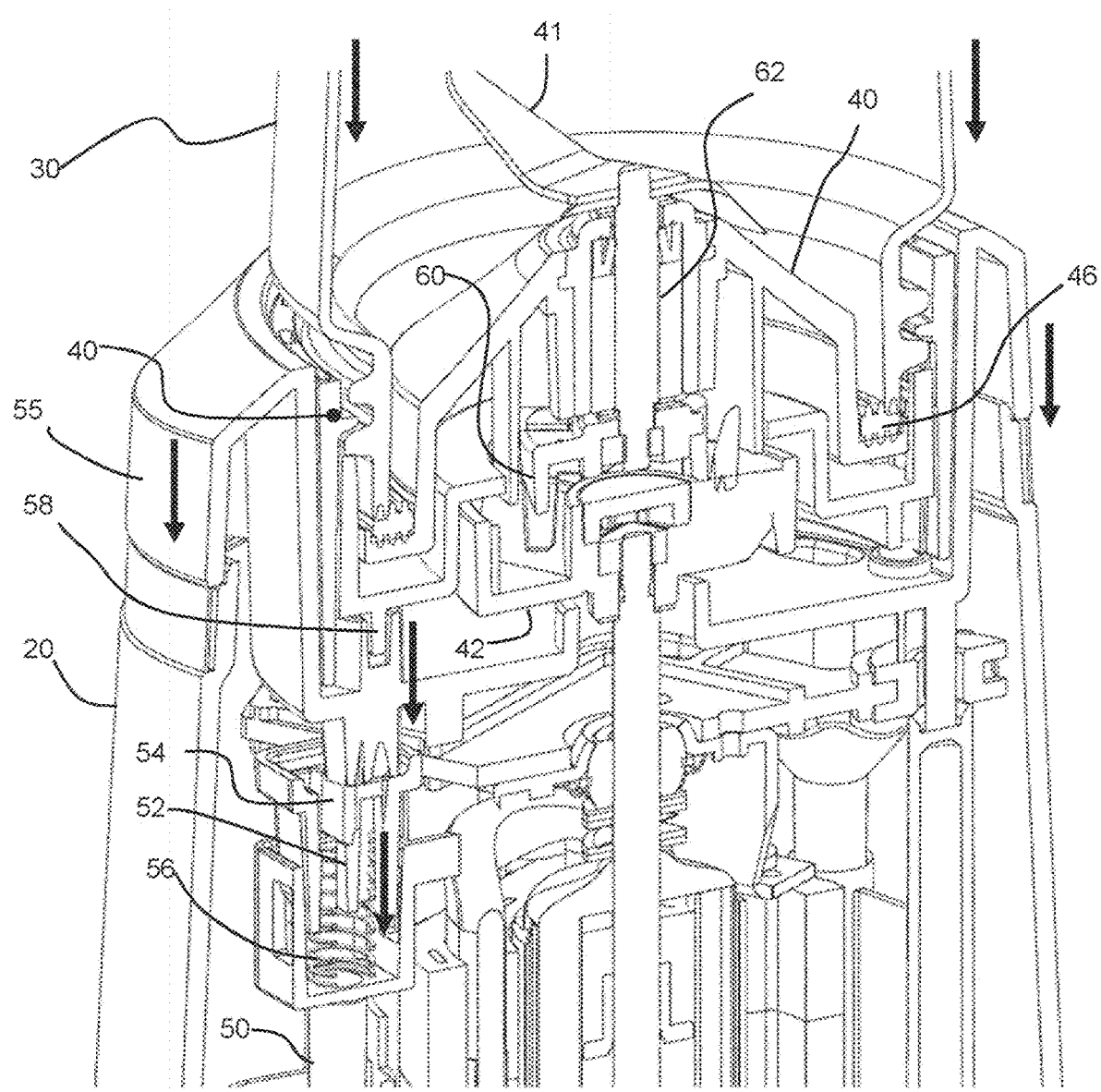
FIG. 5 shows an example of the safety switch design in the base.

FIG. 5 shows an example of the safety switch design in the base and with the food container mounted to the base. A safety switch unit 50 is actuated by a pin 52 carried by a trigger unit 54. The trigger unit 54 is biased upwardly by a spring 56.

The container 30 has a detachable tool holder 40 in this example (as shown in FIG. 1), with a seal 46 between them. Within the tool holder 40 is a safety switch actuator 58 which pushes down on the trigger unit 54 via a sleeve 55. Thus, as shown by the downward arrows in FIG. 5, when the user pushes down, the container 30, the tool holder 40 and the sleeve 55 move down, and this pushes on the trigger unit pushes down the pin 52 to actuate the safety switch unit 50 and thereby turn on the motor.

The tool holder 40 includes a rotary input coupling 60 for rotary coupling to the rotary output coupling 42 of the base. The rotary food processing element 41 is shown as well as its drive shaft 62 which is coupled to the rotary input coupling 60.

The food container 30 is manually depressible towards the base 20 against the bias of the spring 56 in order for the safety switch actuator 58 to actuate the safety switch 50 via the intermediate components 55, 54, 52 as explained above.

This push function may be applied for one or both of the angular orientations. Thus, one or both of the speed settings may have a push-operated pulsed mode. The biasing force of the spring 56 is sufficient to support a maximum full container weight so whenever the user is not pushing down, the safety switch prevents motor operation.

There are various different configurations for the different speed settings and different pulsed operation modes. FIGS. 6 to 10 show in schematic form the top face of the base and show the locations for the different speed settings, i.e. the locations at which the safety switch actuator of the food container needs to be positioned to enable the motor to be turned on.

Figure 6:
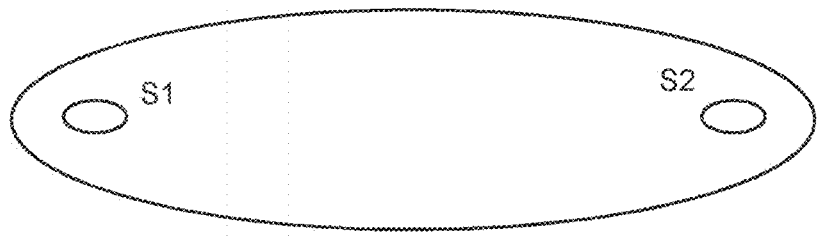
FIGS. 6 to 10 show in schematic form the top face of the base and show locations for the different speed settings and for a pulsed mode setting or settings.

FIG. 6 represents the most basic version (as explained above), in which there are simply two speed settings "S1" and "S2", and no pulsed mode, by connecting the food container with a selected one of two angular orientations 180 degrees apart.

Figure 7:
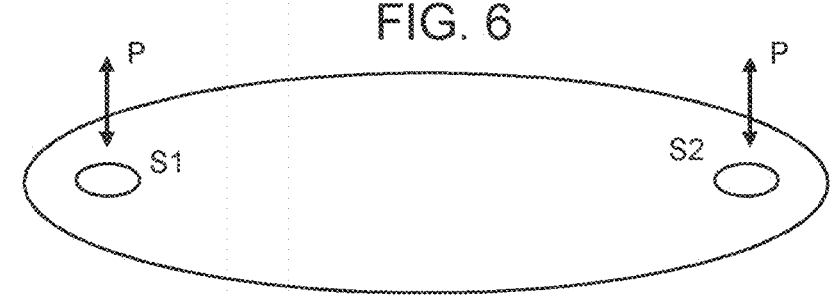

FIG. 7 represents a modification to the most basic version (as also explained above), in which there the two speed settings S1 and S2 each have a push down pulsed mode "P". There may instead be a pulsed mode for only one of them.

Figure 8:
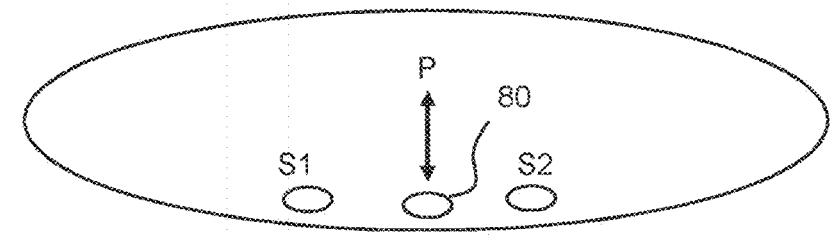

FIG. 8 shows a first alternative in which the food container can only be initially coupled to the base with one angular orientation 80. This is a third angular orientation. The container is then rotatable relative to the base into the first or second angular orientations with the two speed settings S1 and S2.

In the third angular orientation, there is a pulsed mode of operation, as shown, with a suitable rotation speed (which may be the first or second speed, but in this case with no user choice). Thus, in the third angular orientation, the food container is depressible towards the base in order for the safety switch actuator to actuate the safety switch.

To rotate the food container to the continuous mode with a selected speed setting, the food container is pushed down and twisted. It may then lock in the chosen position for the first and second motor speeds and the safety switch actuator actuates the safety switch for continuous motor operation.

The example of FIG. 8 has the two speed setting positions, one on each side of the third orientation.

Figure 9:
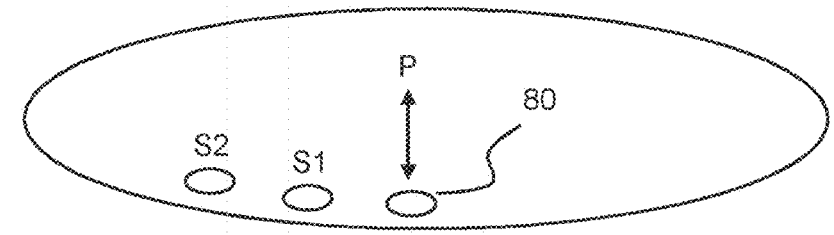

The example of FIG. 9 has the two speed setting positions on the same of the third orientation. Thus, the food container is rotated from the third orientation to the first speed setting (first orientation) and then to the faster second speed setting (second orientation) if desired.

Figure 10:
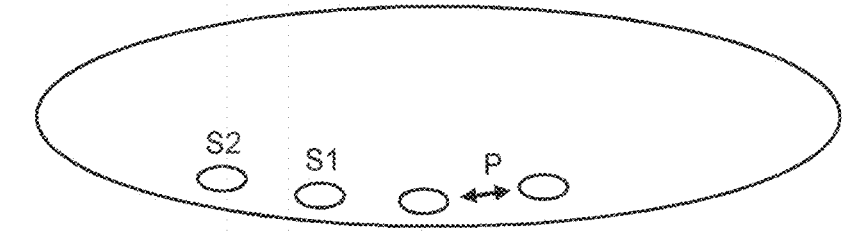

FIG. 10 shows an example in which the food container is again rotatable in one direction from the third angular orientation to the first and second orientations, and again they each have a locked position in which the safety switch actuator actuates the safety switch for continuous operation.

The pulsed mode is in this example implemented by twisting the food container from the third angular orientation to a fourth angular orientation without a locked position. This twisting is against the bias of a spring return system for returning the container from the fourth angular orientation to the third angular orientation. The pulsed mode may use the first or second speed, but in this case with no user choice.

Thus, a pulsed mode of operation can be implemented by twisting the food container to the fourth orientation and then releasing it.

The rotary food processing tool may be any rotary kitchen implement such as a blade, a whisk, a stirrer, a juicer, a grater etc. The invention may be applied to any kitchen appliance which processes food by rotating a processing element in a food container. It is most suitable for devices with limited need for user functionality.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A kitchen appliance, comprising:
   a base comprising:
      a motor;
      a rotary output coupling; and
      a safety switch, wherein actuation of the safety switch enables motor rotation to drive the rotary output coupling; and
   a food container detachably mountable to the base and comprising:
      a rotary food processing element;
      a rotary input coupling for coupling to the rotary output coupling of the base; and
      a safety switch actuator,
      wherein the motor has at least two speed settings and wherein the food container is mountable to the base with at least first and second angular orientations, wherein in each of the at least two angular orientations, the motor is set to a respective one of the at least two speed settings and the safety switch actuator actuates, or can be controlled to actuate, the safety switch.

2. The kitchen appliance of claim 1, wherein the safety switch comprises first and second safety switch parts, with one for each of the first and second angular orientations.

3. The kitchen appliance of claim 1, wherein the food container is mountable to the base directly with a selected one of the first and second angular orientations.

4. The kitchen appliance of claim 3, wherein when the food container is mounted in the first and second angular orientations, the safety switch actuator actuates the safety switch for continuous motor operation.

5. The kitchen appliance of claim 3, wherein when the food container is mounted in the first angular orientation, the food container is manually depressible towards the base in order for the safety switch actuator to actuate the safety switch.

6. The kitchen appliance of claim 5, wherein when the food container is mounted in the second angular orientation, the food container is depressible towards the base in order for the safety switch actuator to actuate the safety switch.

7. The kitchen appliance of claim 5, wherein the food container is depressible against the force of a spring sufficient to support a maximum full container weight.

8. The kitchen appliance of claim 1, wherein the food container is mountable to the base with a third angular orientation and is then rotatable into the first or second angular orientations.

9. The kitchen appliance of claim 8, wherein when the food container is rotated to the first or second angular orientations, the safety switch actuator actuates the safety switch for continuous motor operation.

10. The kitchen appliance of claim 9, wherein when the food container is mounted in the third angular orientation, the food container is depressible towards the base in order for the safety switch actuator to actuate the safety switch.

11. The kitchen appliance of claim 10, wherein the food container is depressible against the force of a spring sufficient to support a maximum full container weight.

12. The kitchen appliance of claim 8, wherein the food container is rotatable in one direction from the third angular orientation to the first and second orientations each having a locked position in which the safety switch actuator actuates the safety switch, and the food container is rotatable in an opposite direction from the third angular orientation to a fourth angular orientation without a locked position.

13. The kitchen appliance of claim 12, comprising a spring return system for returning the container from the fourth angular orientation to the third angular orientation.

14. The kitchen appliance of claim 1, comprising a blender, wherein the food processing element comprises a blade.

* * * * *